Figure 11:
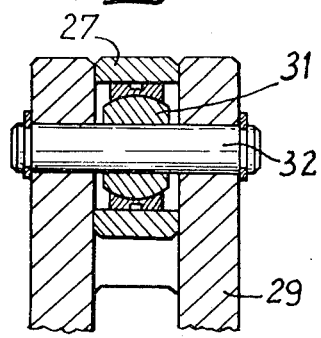

United States Patent [19]

Durand et al.

[11] 4,262,388

[45] Apr. 21, 1981

[54] APPARATUS FOR LONGITUDINALLY CUTTING VERTICALLY SUSPENDED ANIMAL CARCASSES

[75] Inventors: Lucien Durand, Chomerac; Georges Aubert, La Chapelle de Guinchay, both of France

[73] Assignee: Agence Nationale de Valorisation de la Recherche (ANVAR), Neuilly sur Seine, France

[21] Appl. No.: 35,389

[22] Filed: May 2, 1979

Related U.S. Application Data

[63] Continuation of Ser. No. 647,402, Jan. 8, 1976, abandoned.

[30] Foreign Application Priority Data

Jan. 10, 1975 [FR] France .................. 75 00678
Apr. 15, 1975 [FR] France .................. 75 11631

[51] Int. Cl.³ ........................................ A22B 5/20
[52] U.S. Cl. ................................ 17/52; 17/23
[58] Field of Search ......................... 17/23, 51

[56] References Cited

U.S. PATENT DOCUMENTS

| | | | |
|---|---|---|---|
| 1,353,013 | 9/1920 | Appelberry | 17/23 |
| 3,402,425 | 9/1968 | Wexel | 17/23 |
| 3,402,426 | 9/1968 | Wexel | 17/23 |
| 3,641,624 | 2/1972 | Aubert | 17/23 |
| 3,916,482 | 11/1975 | Kvilhaug | 17/23 |

FOREIGN PATENT DOCUMENTS 481890 11/1916 France .

*Primary Examiner*—Willie G. Abercrombie
*Attorney, Agent, or Firm*—Brisebois & Kruger

[57] ABSTRACT

A method of automatically cutting longitudinally animal carcasses for food. A mobile holder is horizontally moved transversely in one direction with respect to a conveyor chain until a first bearing element is brought opposite the inner surface of the animal's vertebral column, a second bearing element is pivoted and pressed against the outer surface of the vertebral column, cutting means is actuated, the mobile holder is moved vertically downwards until the cutting means reaches a predetermined position with respect to the carcass. The mobile holder is then moved horizontally and transversely in the other direction with respect to the conveyor chain, after which the mobile holder is moved vertically upwards to a predetermined position.

22 Claims, 12 Drawing Figures

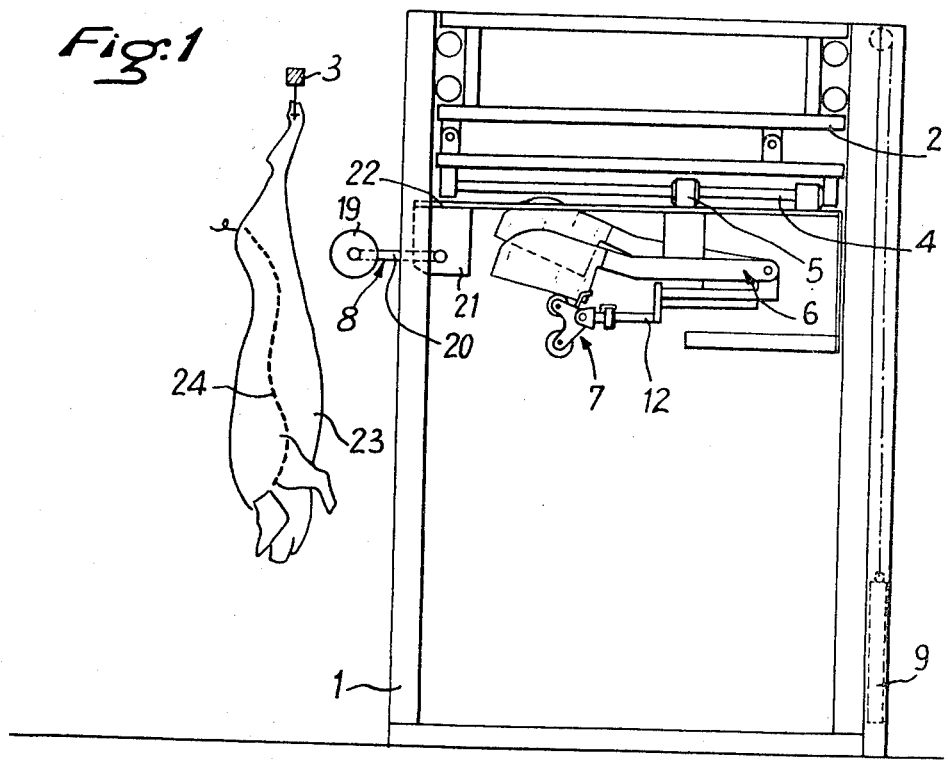
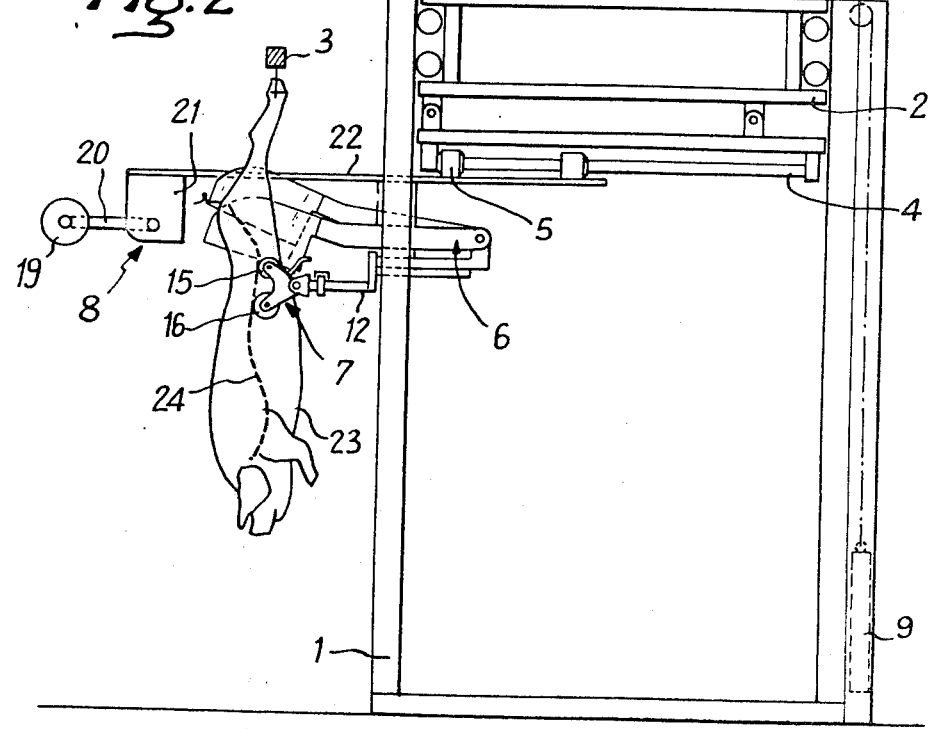

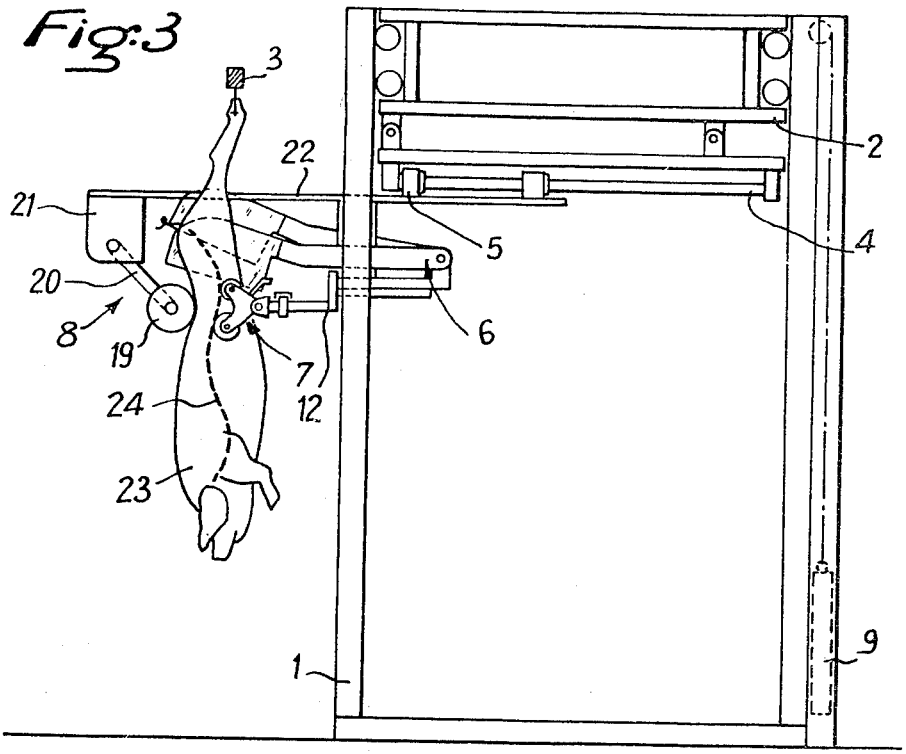
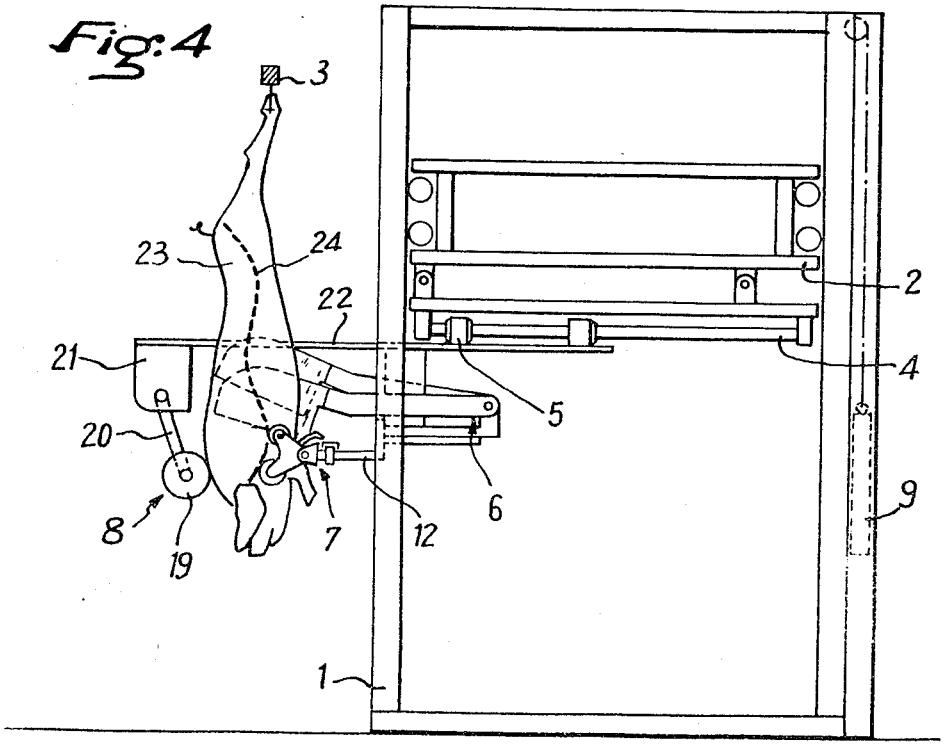

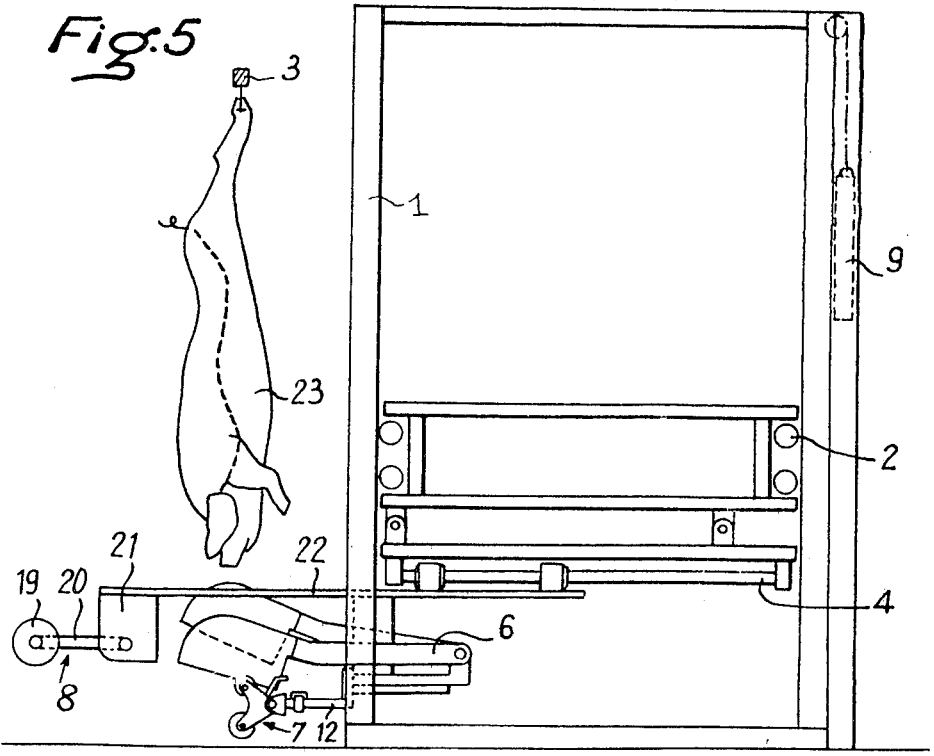
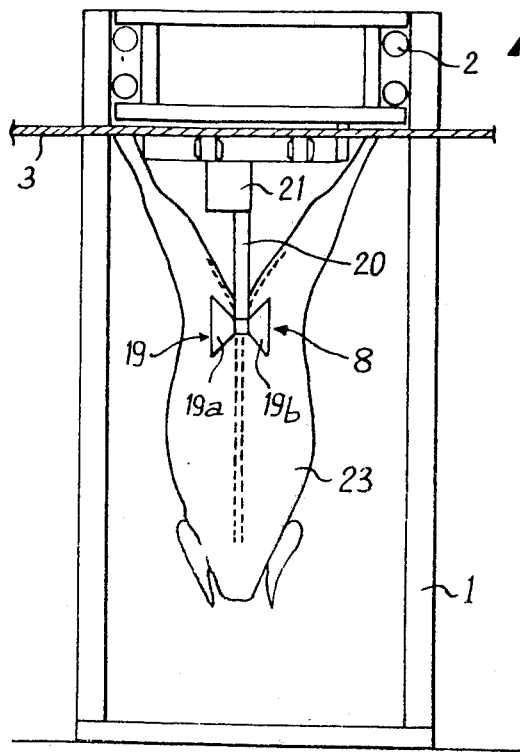
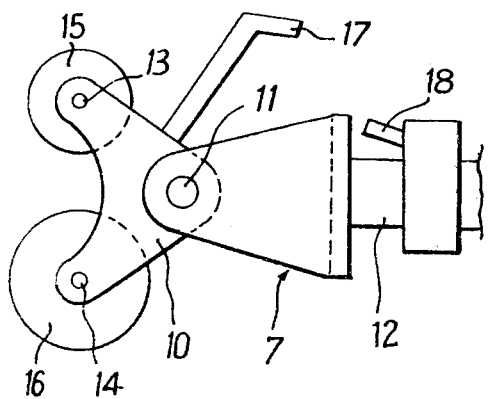

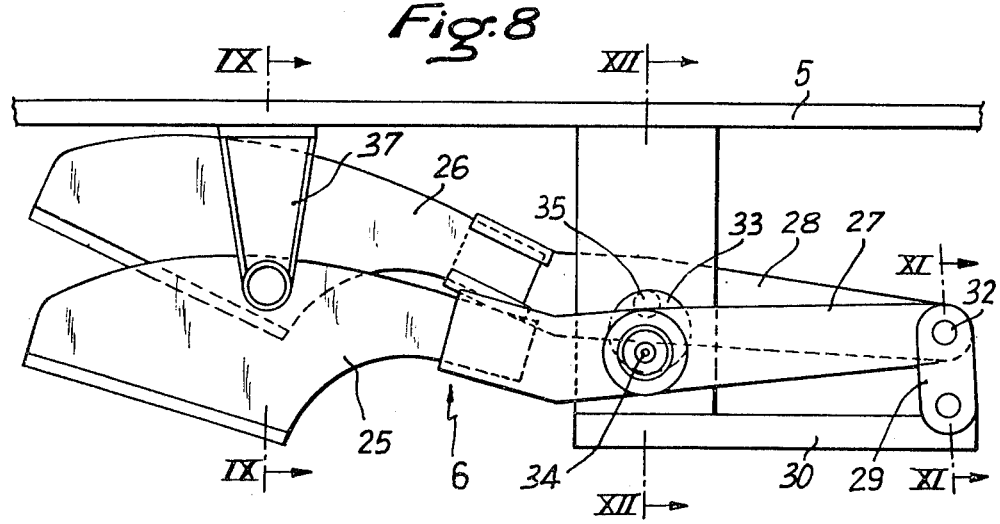
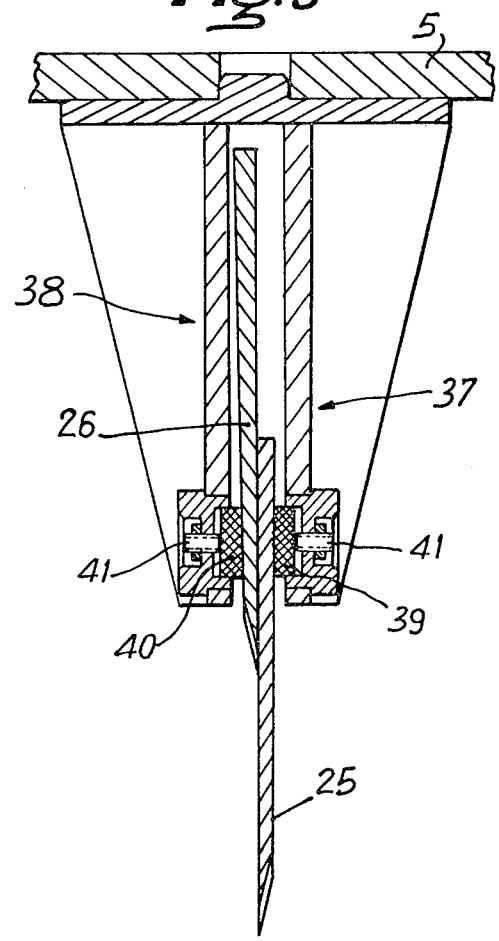

APPARATUS FOR LONGITUDINALLY CUTTING VERTICALLY SUSPENDED ANIMAL CARCASSES

This is a continuation of application Ser. No. 647,402, filed Jan. 8, 1976, now abandoned.

The invention relates to a method and apparatus for longitudinally cutting carcasses of animals for food, the carcasses being vertically suspended from a conveyor chain.

An important problem in connection with the slaughter of animals, such as pigs and cattle, for food is to cut the carcasses longitudinally into two substantially equal parts in a professionally satisfactory manner, i.e. free from bony fragments produced by the cutting the animal's vertebral column.

To achieve longitudinal cutting of this kind, the cutting tool must be accurately guided along the animal's vertebral column. In view of the natural deformations of the vertebral column in the animals to be processed, it has not hitherto been possible to guide the cutting means satisfactorily along the entire carcass, with the result tha the two cut parts are of unequal size, more particularly at the apophyses.

There are a number of known, relatively complex, devices for longitudinally cutting carcasses of animals for food. For example, certificate of addition No. 22 285 to French Pat. Specification No. 1 575 462 describes an apparatus provided with a cutting means secured to a holder which can be moved vertically with respect to the carcass and comprises two adjacent blades which are driven in reciprocation, inter alia via a cam, so that they successively strike the carcass to be cut. One disadvantage of the last-mentioned device is that the two blades do not strike the carcass at exactly the same place, and this usually has an adverse effect on cutting.

An object of the invention is to provide a method and apparatus for longitudinally cutting carcasses of animals for food so as to automatically to guide the cutting means efficiently during its motion along the entire carcass and so as to cut the animal in accordance with professional standards. In addition, the apparatus according to the invention can be incorporated in a carcass-processing circuit, since the cutting operation occurs automatically without stopping the carcass.

The invention relates to a method of automatically and longitudinally cutting carcasses of animals for food, the carcasses being vertically suspended from a conveyor chain, cutting being carried out by vertically moving, with respect to the carcass, a mobile holder bearing a cutting means and a device for guiding the cutting means comprising a first and a second bearing element adapted to come into contact on each side of the inner and outer surfaces respectively of the vertebral column of the animal, the method being characterised in that the mobile holder is horizontally moved transversely in one direction with respect to the conveyor chain until the first bearing element is brought opposite the inner surface of the animal's vertebral column, the second bearing element is pivoted and pressed against the outer surface of the vertebral column, the cutting means is actuated, the mobile support is moved vertically downwards until the cutting means reaches a predetermined position with respect to the carcass and the mobile holder is moved horizontally and transversely in the other direction with respect to the conveyor chain, after which the mobile holder is moved vertically upwards to a predetermined position.

The invention also relates to a novel industrial product, i.e. apparatus for working the method, wherein the cutting means comprises two adjacent blades each secured to an arm connected to the mobile holder, the apparatus being characterised in that the guide device comprises a first bearing element comprising a frame freely pivoting on a first shaft borne by the holder, the frame bearing at least two idle rollers each formed with a central slit, the first bearing element being adapted to come into contact on both sides with the inner surface of the animal's vertebral column, and a second bearing element formed with a central groove and mounted on a second shaft borne by the holder and adapted to be firmly pressed against the animal's back on each side of its vertebral column.

In a preferred embodiment, use is made of two rollers having different diameters, each comprising e.g. two parallel idle discs, the larger-diameter roller being disposed at the bottom of the frame. It can be seen that, when the cutting means descends along the carcass, the rollers of the first bearing element are constantly in contact on either side with the inner surface of the vertebral column and, owing to the pressure exerted against the animal's back by the second bearing element, the vertebral column penetrates into the central slit in the first bearing element, thus ensuring accurate guidance along the entire vertebral column.

The frame of the bearing element may likewise be provided with a means which is secured to the frame and which, when the frame tilts through an angle determined by the inclination of the vertebral column, actuates a contact near the animal's head and/or by abutting the lower maxillary of the animal's jaw, thus stopping the descent of the cutting means and leaving the animal's head intact if required.

In a preferred embodiment, the second bearing element is borne by an arm adapted to pivot near the ends of the second shaft secured to the mobile holder, between a first or rest position in which the arm extends parallel to the shaft and a second position which is inclined with respect to the shaft and in which the arm firmly presses the second element against the animal's back. Advantageously the second bearing element comprises a means mounted at the end of the arm formed with a central groove having inclined edges. In a preferred embodiment, the second element comprises two rollers having a frusto-conical cross-section and freely mounted on a shaft disposed near the end of the arm.

In one embodiment, the apparatus comprises an element secured to the holder and comprising means bearing against the outer surface of each blade of the cutting means so as to press one blade against the other during movement thereof, the blades being inclined with respect to one another outside the region where they are in contact, which is defined by the bearing means.

It can be seen that the cutting edge of each blade may be inclined with respect to the axis of the carcass when the corresponding blade strikes the carcass, so that the two blades are made to converge towards the axis of the carcass during their motion in the direction thereof, so that they strike the carcass at substantially the same point.

Advantageously, the element secured to the holder comprises plates disposed on each side of the blades and secured at the top to the holder, the bearing means being disposed at the bottom of the plates and each advantageously comprising a disc, inter alia of plastics, and a locking means, inter alia a screw, for adjusting the force with which the disc bears on the corresponding blade of the cutting means.

In one embodiment, each arm is jointed at one end to the holder by a link, the arm being moved via a cam.

In order to facilitate adjustment of the cutting means to all shapes of carcasses, inter alia to carcasses of cattle, the arms bearing the blades of the cutting means are connected to links which are articulated at their ends by a swivel joint. It is similarly advantageous for the arms bearing the blades to be secured by a swivel-joint mechanism on the cam, which can accordingly comprise a disc disposed between the arms and connected thereto by diametrically opposite projections, each disposed on one surface of the disc, so that the arms are secured to the projections by a swivel-joint mechanism.

In order to facilitate understanding of the invention, a non-limitative embodiment will now be described with reference to the accompanying drawings in which:

FIGS. 1-5 are diagrammatic elevations of the apparatus according to the invention during various stages of operation.

Figure 12:
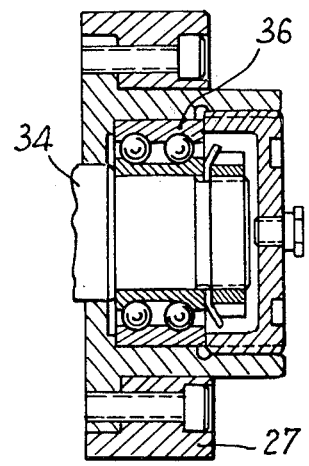
Figure 10:
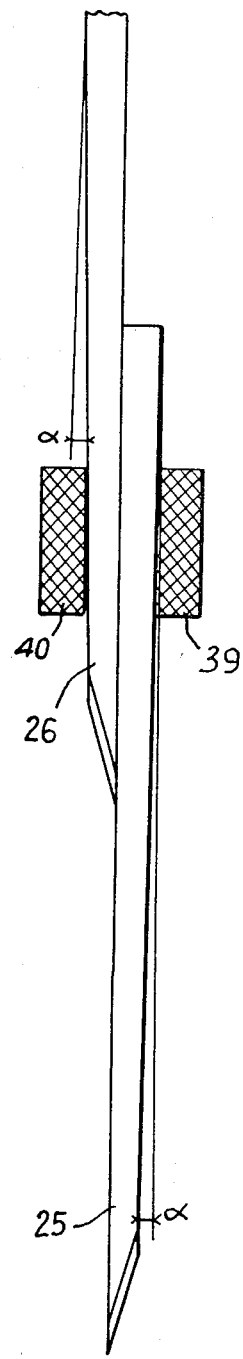

FIG. 6 diagrammatically represents the apparatus according to the invention viewed from the front, during one stage of operation, FIG. 7 shows an embodiment of one element of the device for guiding the apparatus according to the invention, FIG. 8 is a more detailed view of the cutting means in the apparatus according to the invention, FIG. 9 is a view in section along IX—IX in FIG. 8, FIG. 10 is a larger-scale, diagrammatic partial view of a portion of FIG. 9, FIG. 11 is a view in section along XI—XI in FIG. 8, and FIG. 12 is a view in section along XII—XII in FIG. 8.

The apparatus according to the invention comprises a slide 2 which is mounted in a frame 1 and is guided in vertical and horizontal slideways so that it can move vertically along the frame and horizontally inside the frame in a direction parallel to a conveyor rail 3 bearing the carcasses to be cut up.

At the bottom, slide 2 bears horizontal slideways 4 along which a bearing means 5 can slide. At the bottom, means 5 bears a cutting means 6 and a device for guiding the cutting means and comprising two elements 7 and 8.

The assembly comprising slide 2 and the means secured thereby is connected to a counter-weight 9 which can move vertically behind frame 1.

The cutting means, which will be described in detail hereinafter, comprises a device comprising two adjacent blades driven in reciprocation, inter alia by a cam, so that they strike the carcass at substantially the same point.

An embodiment of element 7 of the guide device according to the invention is shown most clearly in FIG. 7.

Element 7 comprises a substantially triangular frame mounted so that it can pivot freely at 11 near the end of a shaft 12 secured to the mobile holder 5. Near its ends, frame 10 bears two shafts 13, 14 each bearing two parallel discs 15, 16 respectively. Frame 10 is made up of two identical parallel parts so as to define a slot between the two halves of frame 10, the two discs 15 and the two discs 16. Discs 16, which are at the lower part of the frame, have a larger diameter than discs 15. Frame 10 also comprises a bent rod 17 the end of which, when frame 10 pivots around its axis 11, is adapted to come into contact with a component 18 borne by shaft 12, a suitable electric connection being provided, as explained hereinafter, so that contact between component 17 and component 18 stops the descent of slide 2 and thus stops the cutting of the animal.

Element 8 of the guide device comprises a roller 19 mounted at the end of an arm 20, the other end of which is pivoted to a component 21 mounted at the end of a shaft 22 secured to holder 5.

As shown most clearly in FIG. 6, roller 19 is in fact made up of two half-rollers 19a, 19b having a frusto-conical cross-section.

We shall now, with reference to FIGS. 1–5, describe the operation of the apparatus for working the method according to the invention for cutting into two parts a carcass 23 of an animal for meat. The animal shown in the drawing is a pig but may in practice be of any other kind, inter alia a cow. The drawings diagrammatically show the animal's vertebral column 24.

FIG. 1 shows the apparatus in the rest position, in which the assembly comprising the cutting means 6 and most of the guide device, except for roller 19, is retracted inside frame 1. Advantageously, the front surface of frame 1 is provided with a protective panel formed with a longitudinal slit through which the guide device and the cutting means can extend. The panel may e.g. be a longitudinally split, flexible plastics sheet.

The carcasses 23 are brought hooked by their back paws along conveyor 3 and move in front of frame 1. Note that, according to the invention, the carcasses do not need to be stopped opposite frame 1 in order to be cut. Since the assembly comprising the guide device and the cutting means is suspended from a mobile slide 2 parallel to conveyor 3, cutting can continue without stopping the motion of the carcasses along the chain, thus substantially increasing the rate of operation.

When the carcass is opposite frame 1, holder 5 bearing the cutting means and the guide means slides along slideways 4 so that cutting means 6 and guide device 7, 8 can come out of the front surface of frame 1 and are positioned with respect to the carcass. As FIG. 2 shows, discs 15, 16 press against the animal's vertebral column 24 so that it is placed between discs 15 and 16 respectively. Arm 20 bearing roller 19 is still in a horizontal position. In the next phase, illustrated in FIG. 3, arm 20 pivots until roller 19 is firmly pressed against the animal's back, so that the vertebral column 24 penetrates into the central slit formed in element 7 between discs 15 and 16 and the two halves of frame 10.

At this moment, slide 2 begins to descend and the blades of the cutting means 6 are actuated so that the assembly comprising the cutting means and the guide device descends along the animal's carcass, and is guided along the entire length of the vertebral column.

Cutting can be stopped at any moment of the descent. If, for example, as required by certain regulations, it is desired not to cut the animal's head into two, the descent stops approximately when the position represented in FIG. 4 is reached. According to the invention, the descent of the cutting means can be automatically stopped at the last-mentioned position since frame 10 of element 7 pivots, owing to the inclination of the vertebral column at the level of the animal's apophyses, or when discs 16 abut the lower maxillary of the animal's jaw, when rod 17 makes contact with the element 18 and automatically triggers the stopping sequence.

If, however, it is desired to cut the animal's head, the descent is allowed to continue to the position represented in FIG. 5, where arm 20 bearing roller 19 rises to the horizontal position and the assembly comprising the guide device and the cutting means rises in the frame up to the position represented in FIG. 5, after which the apparatus is ready to process a new animal coming along the conveyor chain.

Of course, all the operating sequences of the device can be automated and carried out without stopping the carcass on the conveyor chain.

Clearly, also, the invention is in no way limited to the embodiment of the guide-device elements which have been described, inter alia to the shape and number of rollers or discs used for guidance. More particularly, roller 19 could be supplemented by two parallel discs disposed so as to come in contact with the animal's back on each side of its vertebral column, or roller 19 could be replaced by a plate-like element formed with a central groove having inclined walls.

The cutting means 6, which is illustrated in detail in FIG. 5, comprises two identical blades 25, 26 each secured to an arm 27, 28 respectively. Each arm 27, 28 is articulated, at its end remote from blades 25, 26 respectively, by a link 29 to an element 30 secured to element 5.

Each link 29 is articulated to the corresponding arm 27, 28 respectively by a swivel joint 31 disposed between arm 27 or 28 respectively and shaft 32, on which the arm is pivoted to link 29.

Arms 27 and 28 are driven by a cam 33 disposed between arms 27 and 28. The opposite surfaces of disc or cam 33 bear two diametrically opposite projections 24, 25 connected to arms 27 and 28 respectively. Each projection 34, 35 is connected to the corresponding part of arm 27, 28 respectively by a swivel-joint mechanism 36 shown in FIG. 12.

We now refer more particularly to FIGS. 9 and 10. Lateral plates 37, 38 are disposed on each side of blades 25, 26 and secured at the top to holder 5.

At the bottom, each plate 37, 38 bears a block 39, 40 respectively, made of plastics, e.g. the material known as "Celoron". Block 39 presses blade 25 and block 40 presses blade 26. The force with which blocks 39, 40 press blades 25, 26 respectively is determined by adjusting screws 41 which are mounted on plates 37, 38 and press against the outer surface of blocks 39, 40 respectively.

It can be seen, more particularly from FIG. 10, that outside the region of common contact determined by blocks 39 and 40, blades 25 and 26 tend to be inclined at an angle α on FIG. 10 with respect to the vertical, inter alia with respect to the axis of the carcass to be cut. This angle depends on the locking force communicated by screws 41 to blocks 39, 40 bearing on blades 25, 26. When the blades are driven by cam 33 they move with respect to one another so as alternately to strike the carcass. Owing to the bearing force exerted by blocks 39, 40 on a particular region of the blades, each blade strikes the carcass when inclined to the vertical at an angle α, the cutting surfaces of the blades following trajectories which converge towards a single point of the carcass. The locking force of screws 41 must be adjusted depending on the particular operating conditions, but it has been found that particularly satisfactory results are obtained if the locking force causes the blades to slope by 1.2% at the moment when the blade strikes the carcass.

Although the invention has been described in connection with a particular embodiment, it is not of course limited in any way thereby and can be modified in any desired manner without thereby departing from its scope or spirit.

We claim:

1. A cutting station located along a moving conveyor for automatically splitting carcasses of slaughtered animals vertically suspended from said moving conveyor, comprising:
   a horizontal extending holder;
   means for vertically moving said holder;
   means for horizontally moving said holder as said carcass approaches said cutting station, said horizontally moving means permitting movement parallel with, as well as transverse to, said conveyor;
   means carried by said holder for cutting said carcasses; and
   means carried by said holder for bearing against diametrically opposite sides of the carcass backbone and for following the backbone when said holder is moved vertically.

2. An apparatus for automatically splitting carcasses of slaughtered animals vertically suspended from a moving conveyor, comprising:
   a horizontally extending holder,
   means for vertically moving said holder (when said carcass is adjacent said holder),
   means for horizontally moving said holder transversely to the conveyor as said carcass approaches said apparatus,
   cutting means carried by said holder,
   a first bearing element carried by said holder and adapted to come into contact with each side of the inner surface of the animal's backbone and follow it when said holder is vertically moved,
   a second bearing element adapted to pivot at the end of a horizontal shaft secured to said holder, and positioned to be firmly pressed against each side of the outer surface of the animal's backbone opposite the first bearing element.

3. Apparatus as claimed in 2 comprising means for horizontally moving said holder parallel to the conveyor.

4. An apparatus for automatically splitting carcasses of slaughtered animals vertically suspended from a conveyor rail, comprising,
   a horizontally extending holder,
   means for vertically moving said holder when said carcass is adjacent said holder,
   means for horizontally moving said holder transversely to the conveyor rail,
   a first bearing element carried by said holder and adapted to come into contact with each side of the inner surface of the animal's backbone and follow it when said holder is vertically moved, said first bearing element comprising means adapted to actuate a contact stopping the cutting operation,
   a second bearing element carried by said holder and adapted to be firmly pressed against each side of the outer surface of the animal's backbone opposite the first bearing element.

5. Apparatus as claimed in 4 comprising means for horizontally moving said holder parallel to the conveyor rail.

6. An apparatus for automatically splitting carcasses of slaughtered animals vertically suspended from a conveyor rail, comprising
   a horizontally extending holder,
   means for vertically moving said holder, means for horizontally moving said holder parallel and transversely, to the conveyor rail, cutting means carried by said holder, a first bearing element comprising a frame freely pivotable at the end of a first horizontal shaft secured to said holder, said frame carrying at least two idle rollers, each formed with a central slit, said first bearing element being adapted to come into contact with each side of the inner surface of the animal's backbone and follow it when said holder is vertically moved a second bearing element formed with a central groove and carried by an arm, adapted to pivot at the end of a second horizontal shaft secured to said holder, between a first position in which the arm extends parallel to said second shaft, and a second position which is inclined with respect thereto and in which said arm firmly presses said second bearing element against each side of the outer surface of the animal's backbone opposite the first bearing element.

7. Apparatus according to claim 6, in which the frame has two rollers having different diameters, the larger-diameter roller being disposed at the bottom of the frame.

8. Apparatus according to claim 6, in which each roller is made up of two parallel idle discs, the cutting means being adapted to engage between the discs.

9. Apparatus according to claim 6, in which the frame has a means which, when the frame tilts to a given extent, is adapted to actuate a contact stopping the cutting operation.

10. Apparatus according to claim 6, in which the second element comprises two rollers having frusto-conical cross-sections and freely mounted on a shaft disposed near the end of the arm.

11. An apparatus for automatically splitting carcasses of slaughtered animals vertically suspended from a conveyor rail, comprising a horizontally extending holder, means for vertically moving said holder, means for horizontally moving said holder transversely to the conveyor rail, a first bearing element carried by said holder and adapted to come into contact with each side of the inner surface of the animal's backbone and follow it when said holder is vertically moved, a second bearing element carried by said holder and adapted to be firmly pressed against each side of the outer surface of the animal's backbone opposite the first bearing element, cutting means carried by said holder and comprising two adjacent blades each secured to an arm connected to the holder, a pressing member secured to the holder and comprising means bearing against the outer surface of each blade of the cutting means so as to press one blade against another during the reciprocating movement thereof, the blades being inclined with respect to one another outside their region of mutual contact determined by the bearing means.

12. Apparatus according to claim 11, in which the pressing member comprises plates disposed on each side of the blades and secured at the top to the holder, the bearing means being disposed at the bottom of the plates.

13. Apparatus according to claim 11, in which the bearing means each comprise a disc, inter alia of plastics, and a locking device, inter alia a screw, for adjusting the force with which the disc bears on the corresponding blade of the cutting means.

14. Apparatus according to claim 11, in which each arm is jointed at one end to the holder by a link, the arms being moved via a cam.

15. Apparatus as claimed in claim 11 comprising means for horizontally moving said holder parallel to the conveyor rail.

16. Apparatus according to claim 14, in which the arms bearing the blades are connected to the links, which are articulated at their ends by a swivel joint.

17. Apparatus according to claim 14, in which the cam is disposed between the arms bearing the blades and comprises a disc connected to the arms by diametrically opposite projections, each disposed on one surface of the disc.

18. A method of longitudinally splitting animal carcasses vertically suspended from a conveyor, said conveyor having adjacent thereto at least one cutting station including means for splitting said carcass, comprising positioning each splitting means for movement relative to said conveyor, moving said splitting means over the carcass as the carcass nears the cutting station, activating the splitting means and engaging said splitting means with said carcass, moving said splitting means downwardly through the carcass until a predetermined position is reached relative to the carcass as the carcass passes said cutting station, moving said splitting means away from said carcass and deactivating said splitting means as said carcass leaves the cutting station.

19. The method of claim 18 wherein the step of moving said splitting means over said carcass comprises extending said splitting means away from said cutting station toward said conveyor.

20. Apparatus according to claim 17, in which the arms are mounted on the projections by a swivel-joint mechanism.

21. The method of claim 19 wherein the step of extending comprises horizontal movement normal to said cutting station.

22. A method of longitudinally splitting animal carcasses vertically suspended from a conveyor having adjacent thereto at least one cutting station, comprising providing a holder at said cutting station, said holder being positioned for movement relative to said conveyor and including cutting means and bearing means, positioning said bearing means diametrically about said carcass and said cutting means over said carcass as said carcass nears the cutting station, actuating said cutting means after the bearing means engages the carcass, moving the holder vertically downward relative to the carcass until the cutting means reaches a predetermined position relative to the carcass, as the carcass passes the cutting station, deactivating the cutting means after said cutting means reaches said predetermined position, and moving said holder away from said carcass as said carcass leaves the cutting station.

* * * * *